United States Patent

Hagl et al.

Patent Number: 6,097,318
Date of Patent: Aug. 1, 2000

[54] POSITION MEASURING SYSTEM AND METHOD FOR OPERATING A POSITION MEASURING SYSTEM

[75] Inventors: Rainer Hagl, Altenmarkt; Mathias Hausschmid, Palling; Erwin Spanner, Traunstein; Jürgen Thiel, Surberg; Johann Streitwieser, Grabenstätt, all of Germany

[73] Assignee: Dr. Johannes Heidenhain GmbH, Traunreut, Germany

[21] Appl. No.: 09/061,311

[22] Filed: Apr. 16, 1998

[30] Foreign Application Priority Data

Apr. 16, 1997 [DE] Germany .............................. 197 15 742
Sep. 25, 1997 [DE] Germany .............................. 197 42 317

[51] Int. Cl.⁷ ...................................................... H03M 1/22
[52] U.S. Cl. ................................................. 341/7; 341/116
[58] Field of Search ................................... 341/11, 5, 116, 341/6, 7, 8, 144, 155

[56] References Cited

U.S. PATENT DOCUMENTS

| | | | |
|---|---|---|---|
| 4,225,931 | 9/1980 | Schwefel | 364/577 |
| 4,462,083 | 7/1984 | Schwefel | 364/577 |
| 4,594,579 | 6/1986 | Schmitt et al. | 340/347 |
| 4,739,197 | 4/1988 | Schmitt | 307/511 |
| 4,854,709 | 8/1989 | Mehnert et al. | 356/375 |
| 5,131,017 | 7/1992 | Huber et al. | 377/24 |

FOREIGN PATENT DOCUMENTS

02099826  11/1990  Japan.

*Primary Examiner*—Michael Tokar
*Assistant Examiner*—Peguy JeanPierre
*Attorney, Agent, or Firm*—Brinks Hofer Gilson & Lione

[57] ABSTRACT

A position measuring system for the determination of the relative positions of two objects which can be moved with respect to each other, as well as a process for operating the same are disclosed, which in case of a relative movement provides at least one pair of phase-shifted analog incremental signals, and which makes possible a definite variation of the signal periods (SP) by at least one signal period variation factor (n) of the analog incremental signals transmitted to an evaluation unit arranged behind it by a signal period variation unit. The signal period variation unit furthermore comprises correction means for eliminating most varied errors in the output signals (SIN', COS'). Among these are counted errors possibly resulting during the signal period variation, as well as measurement arrangement-specific errors.

52 Claims, 3 Drawing Sheets

POSITION MEASURING SYSTEM AND METHOD FOR OPERATING A POSITION MEASURING SYSTEM

FIELD OF THE INVENTION

The invention relates to a position measuring system and method for determining the relative position of two objects which can be moved in relation to each other. When there is relative movement, the system provides at least one pair of phase-shifted analog incremental signals to a downstream evaluation unit. A defined variation of the signal periods of the analog incremental signals by at least one signal period variation factor transmitted to the downstream arranged evaluation unit is provided by a signal period variation unit.

BACKGROUND OF THE INVENTION

Besides the transmission of already digitized, or rectangular incremental signals, known incremental position measuring systems also make the transmission of sine-shaped analog incremental signals to a downstream arranged evaluation unit possible. In this case the analog incremental signals can be generated in the most varied manner, for example by optical, magnetic, inductive or capacitive scanning of a physically embodied scale graduation. Besides this, the analog, position-dependent incremental signals can also be generated by an interferometer, in which case the light wavelength, or respectively appropriate fractions thereof, instead of a physical scale structure, constitutes the graduation normal. It would also be conceivable to employ fractions of other wave forms as graduation normals, for example when using microwaves, acoustical waves, etc. in the same way.

Processing of the transmitted analog incremental signals is initially performed by the evaluation unit, for example, a further division in the form of an interpolation. The transmission of analog incremental signals from the position measuring system to the evaluation unit offers some advantages, such as a low transmission frequency with constant measuring steps, as well as a relatively high permissible displacement velocity even at small measurement steps.

If, however, position measuring systems of high resolution and correspondingly short signal periods are employed, for example, laser interferometers or interferentially operating optical position measuring systems, a number of problems can result in connection with the transmission of analog incremental signals. For example, if the signal periods of such position measuring systems lie in the range of approximately 0.5 $\mu$m, high signal frequencies of the analog incremental signals on an order of magnitude of approximately 2 MHz already result at relatively slow displacement velocities of 1 m/s. Not all evaluation units are capable of processing such high-frequency analog incremental signals. Problems furthermore arise in connection with the transmission of high-frequency incremental signals over large distances. If there is interference with the signal transmission, errors in the position determination by the evaluation unit result. For example, in order to increase resolution, in particular, in the case of signal interpolation being performed on the part of the evaluation unit, ideal sine-shaped incremental signals from the position measuring system is a prerequisite.

Furthermore, in connection with various applications, different demands are sometimes made on the resolution of the analog incremental signals provided by the position measuring system. While for high displacement velocities no extreme exactness of the position determination is, as a rule, required, at slower relative velocities higher demands are usually made on the available resolution of the analog incremental signals of the position measuring system.

SUMMARY OF THE INVENTION

It is therefore an object of the present invention to provide a position measuring system and method for operating the system, which, on the one hand, avoids the problems in the use of high-resolution position measuring systems with short signal periods. On the other hand, the demands on the resolution of the position measuring system, which differ as a function of the velocity, are also met. Furthermore, measuring operations that are as free as possible of errors are also desirable over extended measuring distances, or respectively longer measuring times.

In accordance with the invention, a variable signal period or signal frequency, of the analog output signals transmitted by the position measuring system to a downstream arranged evaluation unit is provided. It is thus possible to reduce the possibly too high signal frequency of the analog incremental signals in the case of high-resolution position measuring systems or in the case of high relative velocities. A signal period variation unit is provided for this purpose which, for example, can be assigned to the position measuring system, or is arranged between the position measuring system and the evaluation unit. Besides the incremental signals modified in this way with changed signals periods or signal frequencies, it is of course also possible to transmit unchanged or unmodified analog incremental signals between the position measuring system and the evaluation unit. The position measuring system according to the present invention thus allows the use of high-resolution incremental measuring systems with evaluation units which basically do not permit such high input frequency analog incremental signals. Furthermore, high displacement velocities are also possible since the signal period can be suitably decreased, which is sufficient for a position determination of adequate precision. For increasing the resolution, it is then possible on the part of the evaluation unit to perform a further electronic division or interpolation of the transmitted sine- and/or cosine-shaped incremental signals in a known manner.

The variation of the signal period of the analog incremental signals transmitted to the evaluation unit can take place automatically, for example as a function of the velocity, or manually by the user if, for example, the associated evaluation unit can only process a defined maximal input frequency of the analog incremental signals.

The present invention can be employed with position measuring systems with physically embodied scale graduations and also with position measuring systems which use, for example, the light wavelength or fractions thereof as the graduation normal, i.e. with interferometers. The present invention offers particular advantages if a conversion of the incremental signal units into defined predetermined units is required and/or if various environmental effects must be compensated. Furthermore, the present invention also assures error-free operation of a position measuring system over increased measuring paths and/or increased measurement times.

Further advantages as well as details of the position measuring system and method in accordance with the invention, ensue from the following description of preferred embodiments.

DETAILED DESCRIPTION OF THE PRESENTLY PREFERRED EMBODIMENTS

Figure 1:
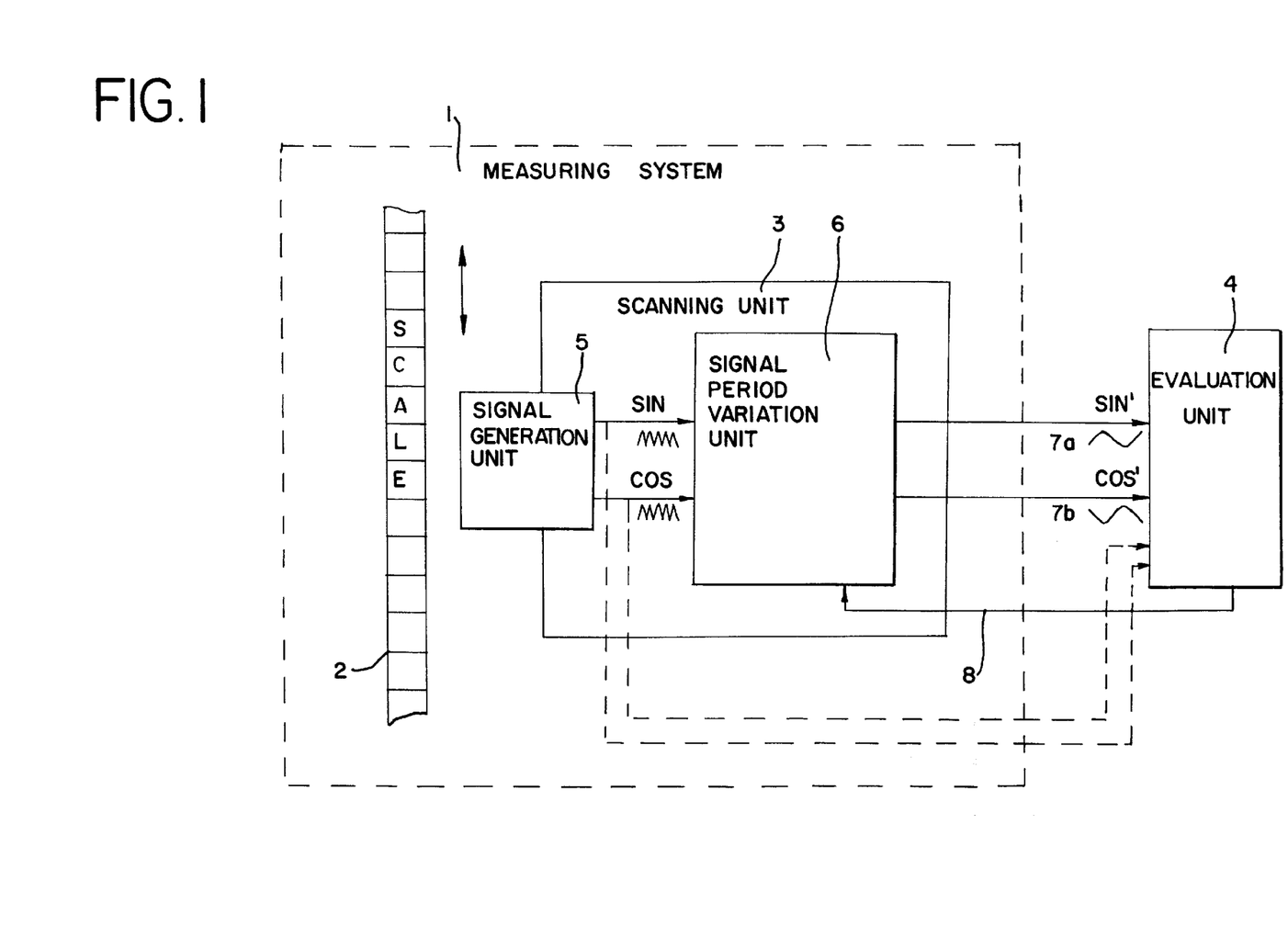
FIG. 1 is a schematic diagram of a position measuring system according to a first preferred embodiment of the present invention.

FIG. 1 is a schematic diagram of a position measuring system 1 according to a preferred embodiment of the present invention. The measuring system 1 includes a scale 2 and a scanning unit 3. The scale 2 includes a graduation as is well known. The scale 2 and scanning unit 3 are displaceable with respect to one another as indicated by the arrow in FIG. 1. An evaluation unit 4 is located downstream of the measuring system and is coupled thereto by signal transmission lines 7a, 7b. The scanning unit 3 includes a signal generation unit 5 and a signal period variation unit 6. The signal generation unit 5 scans the scale 2 and generates analog incremental signals SIN and COS as is well known to those of ordinary skill in the art. The analog incremental signals SIN and COS may be transmitted to the evaluation unit 4 directly as shown by the dotted lines or they can be transmitted to the signal period variation unit 6 where they are modified as will be described in detail hereinafter.

The scale 2 and the scanning unit 3 may be coupled to elements of a machine tool which can be moved toward each other and whose position relative to each other is to be determined with high accuracy. In such a case a conventional numerical machine tool control is provided as the evaluation unit 4.

While FIG. 1 schematically represents a position measuring system for detecting linear relative movements, it is of course possible to design rotatory position measuring systems in accordance with the present invention.

In the course of relative movement of the scale 2 and the scanning unit 3, periodically modulated analog incremental signals SIN, COS are generated by the signal generation unit 5. To this end at least two periodically modulated signals, which are preferably phase-shifted by 90°, are required from which the position information regarding the relative positions of the scale 2 and the scanning unit 3, as well as corresponding directional information, are available. In principle, another defined phase shift, for example 120°, could also be provided.

The generation of the analog incremental signals SIN, COS by the signal generation unit 5 can take place in the most varied manner, i.e., it is possible to employ optical, magnetic, inductive or capacitive scanning principles provided an appropriate scale 2 and scanning unit 3 are selected as is well known. In view of this no additional details regarding the actual scanning principles are represented in FIG. 1.

In case of an optical position measuring system 1, for example, the scale 2 may be embodied to be reflective. In this case the signal generating unit 5 needed for generating the analog incremental signals SIN, COS includes one or several light sources, as well as opto-electronic detector elements which detect the beams reflected by the scale 2.

In principle it is also possible to employ the present invention described hereinafter not only with position measuring systems having a physically embodied scale graduation, but also with position measuring system designed as an interferometer where the graduation normal is set by the light wavelength used. A unit which is suited for processing the analog incremental signals on the part of a position measuring system embodied as an interferometer will be described in detail with reference to FIG. 4.

The analog incremental signals SIN, COS generated in the first preferred embodiment shown in FIG. 1 by scanning the scale are transmitted to the signal period variation unit 6 which is located in the scanning unit 3 in this preferred embodiment. Depending on the desired or required signal period or signal frequency, it is possible to vary the signal period of the analog incremental signals SIN, COS in a definite manner by the signal period variation unit 6. Details regarding preferred embodiments of the signal period variation unit 6 will follow from the subsequent description of FIG. 2, in which a first preferred embodiment of the signal period variation unit 6 is schematically represented. The analog incremental signals SIN, COS modified by the signal period variation unit 6 are thereafter transmitted by the signal transmission lines 7a, 7b in the form of modified analog incremental signals SIN', COS' to the downstream arranged evaluation unit 4 for further processing. Here the modified incremental signals SIN', COS', as a rule, have a larger signal period, or respectively a lower signal frequency, than the analog incremental signals SIN, COS initially generated by the position measuring system 1.

A control line 8 couples the evaluation unit 4 with the position measuring system, and, in particular, with the signal period variation unit 6. A desired or required change of the signal period can be requested by the evaluation unit 4 by transmitting a control signal by one or several control lines 8. It is possible to provide a separate, additional connecting line as the control line 8, but the use of already present connecting lines between the position measuring system 1 and the evaluation unit 4 for this purpose is also possible. In the latter case, for example, an appropriate control signal could be modulated onto the power supply line or another suitable connecting line.

In addition, a direct connection between the signal generating unit 5 and the evaluation unit 4 is indicated by dotted lines in FIG. 1. This is intended to illustrate that the transmission of unmodified incremental signals SIN, COS from the position measuring system 1 to the evaluation unit 4 is of course also possible, without a change of the signal period by the signal period variation unit 6 taking place. The transmission of the unchanged incremental signals SIN, COS can take place either by separate signal transmission lines, as indicated in FIG. 1, or by the two signal transmission lines 7a, 7b. In the latter case the analog incremental signals SIN, COS would therefore pass through the signal period variation unit 6 without any change in their signal period or signal frequency.

A change of the signal period of the analog incremental signal SIN, COS which are transmitted to the evaluation unit 4 can be necessary for different reasons. For example, a high-resolution position measuring system provides analog incremental signal SIN, COS with a relatively small signal period, so that high frequency incremental signals are present at the input of the evaluation unit 4. These high frequency incremental signal cannot be further processed by the evaluation unit. In such a case an increase in the signal period, or respectively a reduction in the signal frequency is required.

Alternatively, it is also possible that the transmitted analog incremental signal have very small signal periods, or respectively very high signal frequencies which result in connection with high displacement velocities between the scale graduation 1 and the scanning unit 3. This makes an increase of the signal period, or respectively a decrease of the signal frequency, necessary. If later a reduction in displacement velocities is achieved, it is of course possible to switch back to the smaller signal period of the analog incremental signal SIN, COS, and a higher resolution is again available for position determination.

In the case of a required increase of the signal period, a multiplication of the respective signal period with at least one signal period variation factor (n) is preferably performed. For example, it is also possible to preset several such factors n=4, 8, 16, by which the signal period of the analog incremental signal SIN, COS is increased if it becomes necessary for the reasons mentioned above. Besides a whole number signal period variation factor (n), it is also possible, for example, in case of an inferometer, to select an appropriate non-whole number variation factor (n). For one, the required variation of the signal period of the analog incremental signal SIN, COS can take place by transmission of an appropriate control signal on a control line 8 from the evaluation unit 4 to the position measuring system. Besides this, it is alternatively also possible to provide the setting of a defined desired signal period manually by the user, for example, by a suitable switching element (not shown) on the part of the position measuring system.

In the case of the variation of the signal period provided by a control signal transmitted by the evaluation unit 4, it is furthermore possible to perform a velocity-dependent variation of the signal period automatically. If, for example, in the course of this a defined displacement velocity is exceeded, it is possible by the appropriate transmission of a control signal to switch the measuring operation over to the output of analog incremental signals SIN', COS' of a suitably increased signal period. Correspondingly, when this displacement velocity falls below the limit again, the signal period of the analog incremental signal is reduced again.

Such a velocity-dependent variation of the signal period of the transmitted analog incremental signal SIN, COS can of course also be realized in connection with more than two available different signal periods. For example, it is possible to provide suitable signal periods, or respectively multiplication factors (n), for the analog incremental signal SIN, COS for several velocity ranges, between which a switch is then made respectively as a function of the velocity.

The detection of the velocity required for an automatic variation of the signal periods of the transmitted analog incremental signal SIN, COS can take place in several ways. For example, a separate velocity detector can be provided. It is also possible to only detect the frequency of the analog incremental signal SIN, COS in order to have information regarding the actual displacement velocity available in this way. The appropriate velocity information is utilized by the evaluation unit 4 for requesting a change in the signal period of the analog incremental signal SIN, COS at defined velocities.

A first preferred embodiment of the signal period variation unit 6 will be explained in more detail below with respect to FIG. 2. Here, the embodiment shown can be employed particularly in connection with the position measuring system shown in FIG. 1. The analog incremental signals SIN, COS generated by the signal generating unit 5 are transmitted to the signal period variation unit 6 and reach first and second interpolation units 9, 10. While the first interpolation unit 9 performs a multiple division of the analog incremental signal SIN, COS in a known manner, for example by a factor of 100, counting of the respective signal zero crossings takes place in the second interpolation unit 10. The two interpolation units 9, 10 respectively provide a digital word at the output which is transmitted to a memory module 11 arranged behind it, or respectively is used for addressing it. In turn, the memory module 11 contains a number of conversion tables for different variation factors (n) of the signal periods of the analog incremental signal SIN, COS. Accordingly, an appropriate conversion table per variation factor (n) is available. Depending on the desired increase of the signal period, a defined changed position value, which results from the two transmitted digital words, is assigned by the conversion table to each position value of the two signals, so that a respective signal course with an increased signal period results. Following such signal processing, the memory module 11 provides actuating signals at its output for D/A converters 12A, 12B arranged downstream of the memory module 11, which generate quasi-analog sine- and cosine-shaped incremental signals SIN', COS'. These modified incremental signals SIN', COS' are then transmitted to the evaluation unit 4 shown in FIG. 1.

Figure 3:
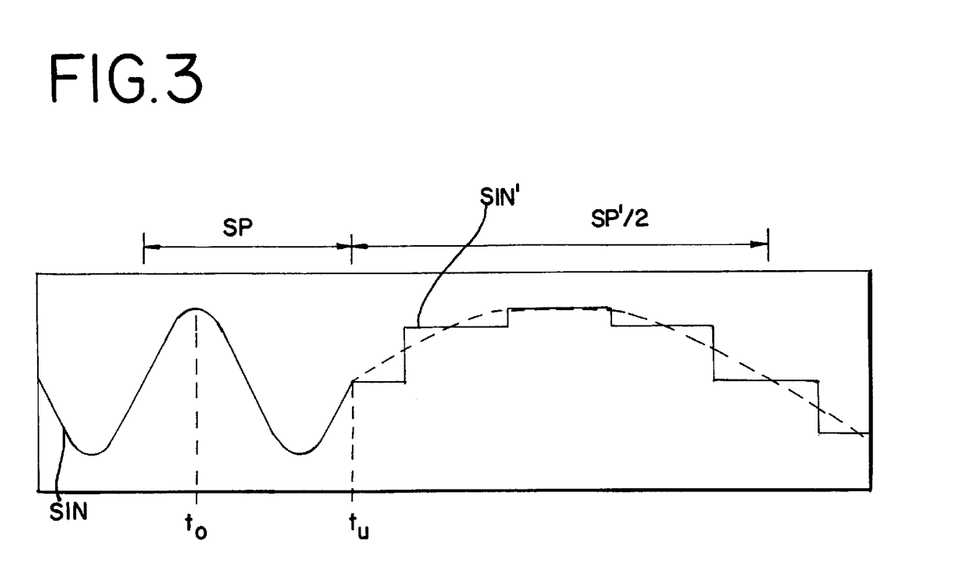
FIG. 3 is a representation of the signal shape according to a preferred embodiment of the position measuring system of FIG. 1 shortly before, and shortly after the variation of the signal period of the analog incremental signal.

A representation of the signal shape of at least one analog incremental signal SIN shortly before, and shortly after the variation of the signal period SP is shown in FIG. 3. Here, the analog incremental signal SIN provided by the signal generation unit 5, whose signal period SP is to be changed, can be seen in the left half of FIG. 3. The request for increasing the signal period SP takes place at the time $t_0$, for example by transmission of a control signal from the evaluation unit. After a further signal period SP of the analog incremental signal SIN, the signal period SP is varied at the switching time $t_u$ by the signal period variation unit, i.e. an increase of the signal period SP by the factor n=4 is provided in the illustration shown. Starting at the switching time $t_u$, the incremental signal SIN', which has been frequency-modified in the signal period SP', is transmitted to the evaluation unit. The switching time $t_u$ has been selected in such a way that switching to the other signal period SP' takes place at a zero crossing of the analog incremental signal SIN.

The quantization of the modified incremental signal SIN' is represented in a greatly exaggerated form in FIG. 3. The ideal sine-shaped form of the incremental signal SIN' is indicated by dash-dotted lines. In this case the quantized incremental signal SIN' corresponds the more to the ideal, sine-shaped incremental signal, the higher the resolution of the D/A converter units in the signal period variation unit.

Figure 4:
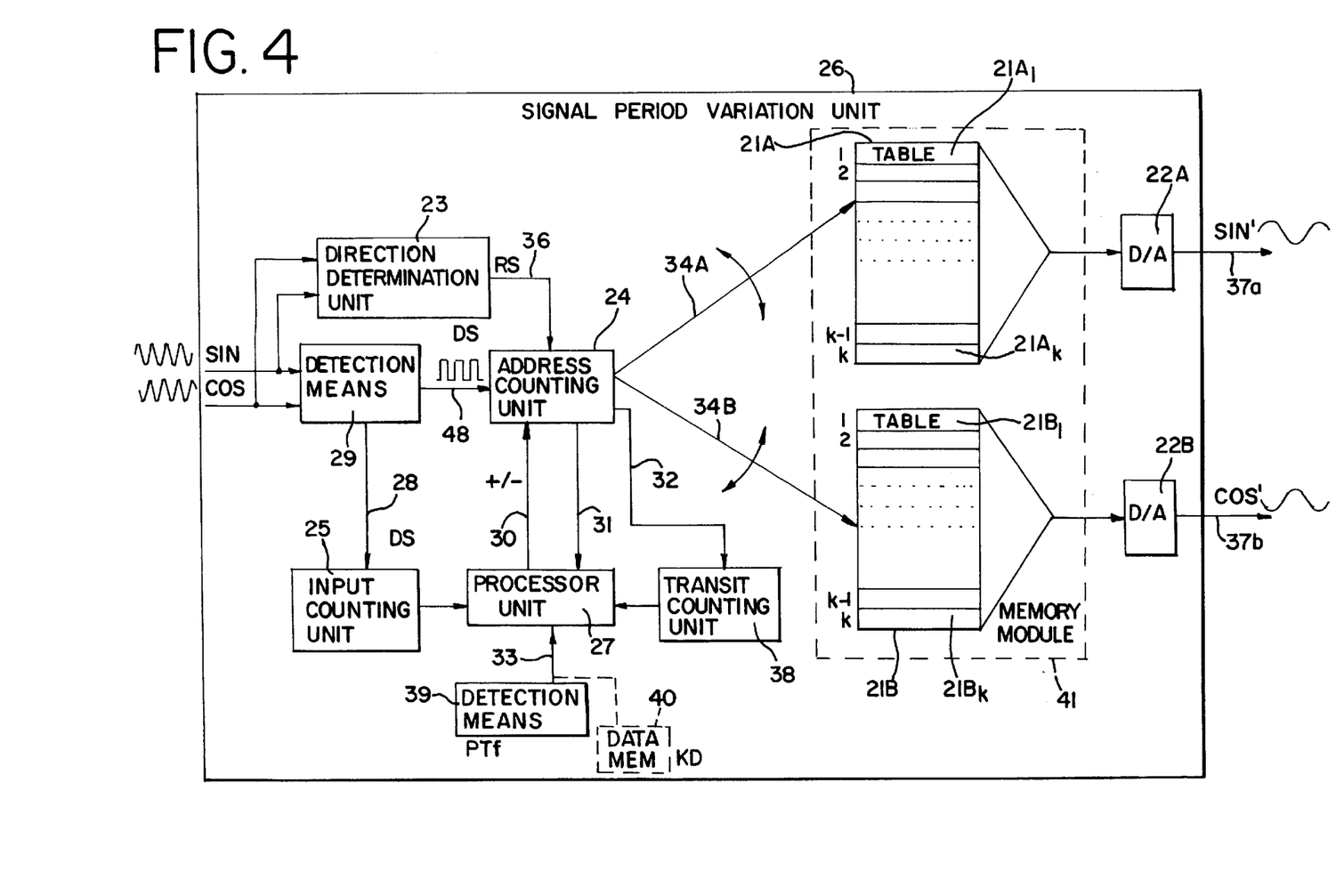
FIG. 4 is a block circuit diagram of a second preferred embodiment of a signal period variation unit which can be employed with a position measuring system embodied as an interferometer.

FIG. 4 is a block circuit diagram of a second preferred embodiment of a signal period variation unit 26 which can be particularly employed with a position measuring system embodied as an interferometer. The measures explained in connection with the first preferred embodiment can of course also be realized in connection with the following preferred embodiment.

Besides alternative possibilities for varying the signal period, or respectively the defined presetting of the signal period of the analog incremental signal transmitted to an evaluation unit, different correction means, which are used to eliminate various errors which can occur in the course of the position determination, will also be described by the second preferred embodiment in what follows.

The pair of phase-shifted incremental signals SIN, COS generated by a known interferometer arrangement (not shown) is supplied to a signal period variation unit 26. As in the previous example, signal period variation unit 26 provides, among other things, the desired variation of the signal period, and provides at its output the correspondingly analog incremental signals SIN', COS', which are transmitted by signal transmission lines 37a, 37b to an evaluation unit (not shown) for further processing, such as electronic signal interpolation.

The signal period variation unit 26 includes an interpolation unit 29, a direction determination unit 23, an input counting unit 25, an address counting unit 24, a processor unit 27, a transit counting unit 38, a detection means 39, a memory module 41 and a first and second D/A converters 22A, 22B. The incremental signals SIN, COS provided by the position measuring system, or respectively the interferometer, are transmitted to the interpolation unit 29 as well as to the direction determination unit 23. The interpolation unit 29 provides a further electronic division of the input signal SIN, COS in a known manner, i.e., the interpolation unit 29 provides at its output interpolated digital signals DS, or respectively rectangular pulses with a higher frequency than the input signals SIN, COS. A direction signal RS regarding the movement direction of the two elements is generated by the direction determination unit 23 on the basis of the two incremental signals which are preferably phase-shifted by 90°.

The interpolated digital signals DS as well as the direction signal RS are transmitted by data lines 36 and 48 to the address counting unit 24. Depending on the direction of movement, or respectively the received direction signal RS, a change of the address counting value AZW takes place in the address counting unit 24. In case of a forward movement, the address counting value AZW at each rectangular pulse is increased or counted forward by one value, for example. In case of a reverse movement, a decrease of the address counting value AZW at each rectangular pulse, or respectively a backward count, takes place. If no rectangular pulse, or respectively digital signal DS from the interpolation unit 29, is present, the address counting value AZW remains unchanged.

The memory module 41 located downstream of the address counting unit 24 preferably stores two conversion tables 21A, 21B in the form of a sine, or respectively cosine, table. The conversion tables 21A, 21B include respectively k addressed tables $21A_1$ to $21A_k$ and $21B_l$ to $21B_k$, where the signal amplitude values of at least one period of a sine, or respectively cosine, function are stored in digital form in the respectively k table areas $21A_1$ to $21A_k$ and $21B_l$ to $21B_k$. The individual k table areas $21A_1$ to $21A_k$ and $21B_l$ to $21B_k$ can be actuated by the address counting unit 24 by address pointers 34A, 34B. Subsequently the signal amplitude values of the table areas $21A_1$ to $21A_k$ and $21B_l$ to $21B_k$ actuated in this way are respectively transmitted to D/A converter units 22A, 22B, which again generate from this the analog incremental signals SIN', COS', which are transmitted to the evaluation unit. It is possible to respectively arrange a suitable electronic filter device (not shown) downstream of the D/A converter units 22A, 22B, which suitably smooths the resultant analog incremental signal SIN', COS'. An output of the address counting unit 24 is provided in the preferred embodiment represented, through which two address pointers 34A, 34B are contacted, which in turn actuate a conversion table 21A, 21B.

However, alternative embodiments can also be realized within the scope of the present invention. For example, in a second preferred embodiment it is possible for the address counting unit to have only a single address pointer at its output which actuates only a single conversion table. In this case the table areas of the combined conversion table which would have to be selected here have twice the memory width in comparison with the first preferred embodiment so that the digital signal amplitude values of the sine, or respectively cosine function, can be respectively stored therein in a combined form.

Finally, in a third preferred embodiment two address pointers of the address counting unit can point to a single conversion table in which, for example, only the digital signal amplitude values of a sine function are stored. However, a phase shift of 90° is provided between the two address pointers so that it is possible in this way to transmit the phase-shifted signal amplitude values of a sine and a cosine function for the output signals to the D/A converter downstream.

The variable signal periods SP' of the analog incremental signal SIN', COS' at the output are generated in the following manner. Assuming only a variation of the input signal periods SP by only whole number signal period variation factor (n), i.e., SP'=n*SP. In the example it is therefore possible at the output to generate signal periods SP' of the analog incremental signal SIN', COS' of 1 μm, 2 μm, 4 μm and 10 μm. Accordingly, the signal periods SP' available at the output are respectively in a whole number relation to each other. In the case of using an He-Ne laser with an emission wavelength λ=633 nm, a signal period SP of the signals SIN, COS of λ/2=633/2 nm is preset in the interferometer. In this example the digital signal amplitude values of a sine, or respectively cosine, function with a signal period which represents the lowest common multiple of the output signal periods SP' are stored in the two conversion tables 21A, 21B, i.e. sine and cosine functions with a signal period of 20 μm.

Depending on the signal period required at the output, the address pointers 34A, 34B are incremented by the interpolation unit 29 at each rectangular pulse by different actuation step sizes, i.e., different table areas $21A_1$ to $21A_k$ and $21B_l$ to $21B_k$ of the conversion tables 21A, 21B are actuated. If analog incremental signals SIN', COS' with the signal period 10 μm, for example, are desired at the output side, the actuation step size with each rectangular pulse is two table steps, i.e. after the table area $21A_1$, the table area $21A_3$ is subsequently actuated by the address pointer, etc. In case of a required signal period of 4 μm, the actuation step size for the address pointers 34A, 34B is five table steps, etc. Accordingly, a defined actuation step size of the address pointers 34A, 34B is assigned to each signal period variation factor (n).

Accordingly, with such an embodiment of the signal period variation unit 26, those digital signal amplitude values of sine and/or cosine functions are stored which correspond to the greatest signal period SP' of the analog incremental signal SIN', COS' desired at the output side, or is in a whole number relationship with respect to all desired signal periods SP' of the analog incremental signal SIN', COS'.

Figure 2:
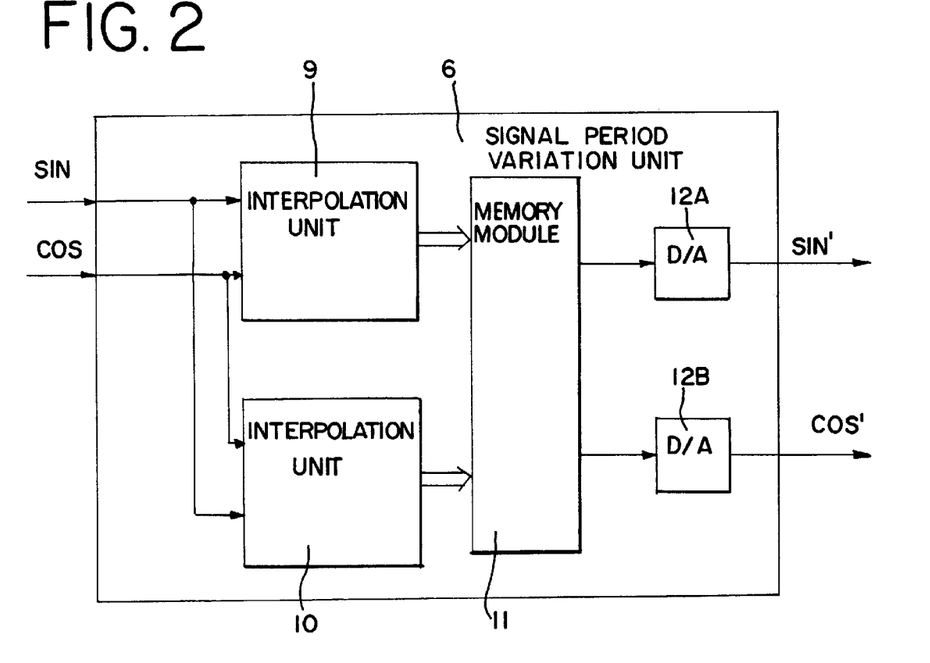
FIG. 2 is a block circuit diagram of a first preferred embodiment of a signal period variation unit which can be employed with the position measuring system shown in FIG. 1.

Alternatively to realize the variable signal period of the analog incremental signal it can be provided, similar to the previously described preferred embodiment of FIG. 2, to store a separate conversion table for the sine and/or cosine function for each desired resolution, or respectively for each required signal period at the output side in the memory module of the signal period variation unit. It is of course also possible to combine the two possibilities mentioned in a suitable manner. For example, it might be conceivable to realize defined whole number signal period relationships by the variant explained by FIG. 4, while other signal periods of the analog incremental signal are realized on the basis of separate conversion tables, as explained above.

As already indicated above, the signal period variation unit 26 of this preferred embodiment furthermore contains various correction means in order to eliminate, or respectively minimize errors in position determination, or respectively signal period variation. An input counting unit 25, a transit counting unit 38 as well as a processor unit 27 are identified as correction means herein, whose mode of operation within the signal period variation unit 26 will be explained in what follows.

The output signals of the interpolation unit 29, already mentioned above, in the form of digital signals DS, or respectively rectangular pulses, are transmitted by the data line 28 to the input counting unit 25, i.e., the actual input counting value EZW represents the number of the rectangular pulses of the interpolation unit 29 transmitted up to that time. By multiplying the input counting value EZW with the preset signal period SP, i.e., the corresponding fraction of the wavelength of the interferometer in air $\lambda_{Air}$ which, in a quadruple evaluation without further interpolation usually is $\lambda_{Air}/8$, the actual set position measuring value SPM during the position determination run therefore results:

$$\text{SPM} = \text{EZW} * \lambda_{Air}/8 \qquad (\text{Eq. 1})$$

Here, $\lambda_{Air}/8$ represents the signal period SP of the input signals SIN, COS. Such a determination of the signal period SP of the input signals SIN, COS in the form of the mentioned multiplication takes place by the processor unit 27 arranged downstream of the input counting unit 25. In this case the unit 25 can of course also be embodied alternatively as a processor, for example as a suitable digital logic device, etc.

A transit counting unit 38 is arranged downstream of the address counting unit 24. The determined transit counting value DZW therefore represents the number of transits of the address pointer 34A, 34B through the conversion tables 21A, 21B, which have taken place up to that time, or respectively the proportion of whole signal periods of the instant actual position measurement value IPM. In connection with the instant actual address counting value AZW, which is transmitted over the data line 31 to the processor unit 27, it is possible to determine the instant actual position measurement value IPM in the processor unit:

$$\text{IPM} = (\text{DZW} + \text{AZW}/k) * \text{SP}' \qquad (\text{Eq. 2})$$

A comparison of the two measurement values SPM and IPM then takes place after such a determination of set and actual position measurement values SPM, IPM by the processor unit 27. If a deviation between the two measurement values SPM, IPM is detected, the address counting unit 24 is subsequently actuated by the processor unit 27 by the data line 30 in such a way that the address counting value AZW is correctively increased or decreased. As a result of the suitable increased or decreased address counting value AZW, again different table areas $21A_1$ to $21A_k$ and $21B_1$ to $21B_k$ of the conversion tables 21A, 21B are actuated, and corrected analog incremental signal SIN', COS' are generated in this way.

In this way it is possible to eliminate, or at least minimize deviations between the actual and the set position measurement values IPM, SPM, and therefore errors in the position measurement. The errors which can be corrected in this way can have different causes here.

A first error source lies in the non-whole number relationship of the laser wavelength $\lambda$ used, i.e., the division normal used, with the usual units, such as, for example, the predetermined signal period SP' of the analog incremental signal SIN', COS', which for example are preset in metric form. In this way an error in the detected actual position measurement value IPM results in the course of each transit through a conversion table 21A, 21B and the generation of the desired output signal period SP' which, among other things, is a function of the number k of the table areas $21A_1$ to $21A_k$, $21B_1$ to $21B_k$ is provided. A cumulative error results with repeated transits through the conversion tables 21A, 21B, so that in the end the position determination would become increasingly incorrect with an increase in measurement duration and/or the measured distance.

However, based on the above mentioned steps, it is assured by the correction means and the continuous comparison of the set and actual position measurement values SPM, IPM that, in case of an error which is greater than the smallest actuation step size of the table areas $21A_1$ to $21A_k$, $21B_1$ to $21B_k$, a correction of the address counting value AZW takes place. This correction by increasing or decreasing the address counting value AZW in this case is performed until the detected deviation between the values SPM and IPM is less than the smallest actuation step size. Another improvement results if such a correction of the address counting value AZW already takes place at a deviation of the set and actual position measurement values SPM, IPM which is greater than half the minimum actuation step size. By this, the maximum error in the position measurement lies at an order of magnitude of half the actuation step size.

A further increase in the measurement accuracy, or respectively a further error reduction by a factor j can be achieved, if a whole number multiple j of the required signal amplitude values is stored in the conversion tables 21A, 21B, i.e. j signal periods of the corresponding sine or cosine functions. In a borderline case it would be possible to store such a number j of signal periods, that they would correspond to the entire measurement distance. The cause for error minimization in such a process lies in that in case of several stored signal periods, the non-whole number remainder from the relationship between the signal periods and the wavelength is less than in the case of only one signal period, for example. As a whole, the result is a cumulative error which is smaller by the factor j.

A second error source lies in the ambient conditions, such as the air pressure p, the temperature T and humidity f, which fluctuate during the measurement. The respective gas composition in the measuring chamber is also to be counted among the fluctuating ambient conditions.

The wavelength $\lambda_{Air}$ of the radiation source employed in the interferometer, i.e., the signal period SP of the incremental signals SIN, COS, also changes with the parameters p, T, f, and possibly also the gas composition. However, the signal period SP' of the analog incremental signal SIN', COS' on the output side remains unchanged. Again, without a correction it is not assured that the desired relationship SP'=n*SP between the signal periods SP and SP' on the input and output sides applies.

For this reason it has been provided for the embodiment of the signal period variation unit 26 represented in FIG. 4 to also include the ambient parameters in the determination of the set position measurement value SPM made by the processor unit 27, i.e. SPM=f(p, T, f). In this case the ambient parameters p, T, f and possibly also the gas composition are entered into the wavelength $\lambda_{Air}$ used in the determination of SPM in accordance with Equation (1).

Therefore the ambient parameters, such as the air temperature, the moisture and the air pressure, and possibly also the gas composition, are continuously detected by sensors through suitable detection means 39, supplied to the processor unit 27 via the data line 33, and taken into consideration in the determination of the set position measurement value SPM. To this end the wavelength ki is continuously kept up to date in the processor unit by means of the known Edlen formula, and is taken into consideration in the determination of SPM. The effects of the environment on the position accuracy are also minimized by the described correction in the form of increasing or decreasing the address counting value AZW in case of a deviation between the set and actual position measurement values SPM, IPM. At the output side the analog incremental signals SIN', COS' then maximally have an error which lies at an order of magnitude of the resolution of a table area $21A_1$ to $21A_k$, $21B_1$ to $21B_k$, or respectively half a table area, depending on the selected correction step size.

Alternatively to the mentioned detection of the ambient parameters it could also be provided to determine the refractive index of the air in the measuring chamber directly by a refractive index detection unit, for example, a refractometer, and to provide it to the processor unit 27 for further processing. The processor unit 27 additionally uses the output signals of the refractometer for determining the instant set position measurement value.

A data memory 40 is furthermore schematically indicated in FIG. 4, in which measurement arrangement-specific compensation data KD are stored. In case of a machine tool these are, for example, machine-specific correction data in relation to spindle pitch errors, guidance errors, thermal errors, etc., which are also provided to the processor unit 27 during the position determination, similar to the ambient parameters p, T, f. These data KD are also included by the processor unit 27 in the continuous determination of the set position measurement value SPM and are taken into consideration by the described correction when outputting the analog incremental signal, i.e. SPM=f(KD).

In principle it is possible by the signal period variation unit 26 in accordance with the invention to select a signal period conversion factor n=1, so that the correction possible with this, only defined errors in the position determination are eliminated, or respectively minimized, but the input and output signal periods SP, SP' remain unchanged.

There is the further possibility, for example, in case of a position measuring system with a physically embodied scale graduation, to detect possibly present graduation errors beforehand and to store suitable correction data in this regard in a memory. These measuring system-specific correction data can also be taken into consideration by the processor unit in the course of measuring.

It is to be understood that the forms of the invention described herein are to be taken as preferred examples and that various changes in the shape, size and arrangement of parts may be resorted to without departing from the spirit of the invention or scope of the claims.

What is claimed is:

1. A position measuring system for determining the relative position of two objects which can be moved in relation to each other, the position measuring system comprising:
    means for generating at least one pair of phase-shifted analog incremental signals,
    a signal period variation unit comprising:
        a memory module with at least one conversion table for actuating at least one D/A converter unit disposed on an output side of said signal period variation unit, wherein said signal period variation unit receives said at least one pair of phase-shifted analog incremental signals and generates modified analog incremental signals that contain a variation of the signal periods of said at least one pair of phase shifted analog incremental signals by at least one signal period variation factor; and
    an evaluation unit connected to said signal period variation unit so as to receive said modified analog incremental signals.

2. The position measuring system in accordance with claim 1, wherein said at least one pair of phase shifted analog incremental signals have signal periods which have a predetermined ratio with respect to the signal period of said modified analog incremental signals.

3. The position measuring system in accordance with claim 1, wherein said evaluation unit connected via at least one control line with said signal period variation unit, through which the transmission of a control signal for varying the signal periods of said at least one pair of phase-shifted analog incremental signals.

4. The position measuring system in accordance with claim 1, wherein said at least one pair of phase-shifted analog incremental signals with the signal periods of said at least one pair of phase-shifted analog incremental signals are transmitted to said evaluation unit.

5. The position measuring system in accordance with claim 1, wherein said signal period variation unit comprises:
    a first interpolation unit at an input side of said signal period variation unit to which said at least one pair of phase shifted analog incremental signals is transmitted, said first interpolation unit providing a digital word; and
    a memory module that receives said digital word, and wherein said at least one conversion table actuates at least one D/A converter unit disposed on an output side of said memory module.

6. The position measuring system in accordance with claim 5, wherein said first interpolation unit is used for the high-resolution division of said at least one pair of phase-shifted analog incremental signals, and
    wherein said signal period variation unit comprises a second interpolation unit through which signal zero crossovers of said at least one pair of phase-shifted analog incremental signals can be detected.

7. The position measuring system in accordance with claim 1, wherein said signal period variation unit comprises a correction device that eliminates errors resulting in the course of the signal period variation.

8. A position measuring system for determining the relative position of two objects which can be moved in relation to each other, the position measuring system comprising:
    means for generating at least one pair of phase-shifted analog incremental signals,
    a signal period variation unit comprising a memory module comprising a conversion table, which has several addressed table areas, to each of which defined signal amplitude values of modified analog incremental signals transmitted to the evaluation unit are assigned, said signal period variation unit receives said at least one pair of phase-shifted analog incremental signals and generates said modified analog incremental signals that contain a variation of the signal periods of said at least one pair of phase shifted analog incremental signals by at least one signal period variation factor; and
    an evaluation unit connected to said signal period variation unit so as to receive said modified analog incremental signals.

9. The position measuring system in accordance with claim 8, wherein said memory module comprises at least one conversion table per signal period variation factor provided.

10. The position measuring system in accordance with claim 8, wherein said signal period variation unit comprises:
an interpolation unit for the generation of interpolated digital signals and which receives said at least one pair of phase-shifted analog incremental signals,
a direction determination unit which receives said at least one pair of phase-shifted analog incremental signals, and
an address counting unit is arranged behind outputs of said interpolation unit and said direction determination unit, through which on an output side said addressed table areas of said at least one conversion table in said memory module is actuated.

11. The position measuring system in accordance with claim 10, wherein said address counting unit actuates said at least one conversion table for the variation of the signal periods of said at least one pair of phase-shifted analog incremental signals.

12. The position measuring system in accordance with claim 10, wherein at least one D/A converter unit is connected to one or more outputs of at least one memory module, which generates said modified analog incremental signals from signal amplitude values transmitted to said memory module for transmission to said evaluation unit.

13. The position measuring system in accordance with claim 10, wherein said signal period variation unit comprises a correction device that comprises: an input counting unit, a transit counting unit and a processor unit, wherein
output signals of said interpolation unit are supplied to input of said counting unit, from which the instant set position measurement value is determined,
said transit counting unit determines the number of transits through said at least one conversion table, and
said processor unit continuously determines the instant set position measurement value by output signals of said input counting unit and compares the instant set position measurement value with the instant actual position measurement value, which results from the actual setting of said address counting unit and the actual setting of said transit counting unit, and in case of a deviation between the set and actual position measurement values changes address counting values of said address counting unit in a defined manner.

14. The position measuring system in accordance with claim 13, wherein said correction device further comprises a detection system that comprises sensors that continuously detect parameters in respect to the measuring environment, and wherein said detected parameters are supplied to said processor unit, which utilizes them in addition for the determination of the instant actual position measurement value.

15. The position measuring system in accordance with claim 13, wherein said correction device further comprises a data memory, in which measurement arrangement-specific compensation data are stored, which can be supplied to said processor unit, which additionally utilizes these compensation data for determining the instant set position measurement value.

16. The position measuring system in accordance with claim 13, wherein said correction device further comprises a refractive index determination unit that generates output signals that are supplied to said processor unit, which utilizes them in addition for the determination of the instant set position measurement value.

17. The position measuring system in accordance with claim 8, wherein said signal period variation unit comprises a correction device that eliminates errors resulting in the course of the signal period variation.

18. The position measuring system in accordance with claim 1, wherein said signal period variation unit comprises a memory module comprising a conversion table, which has several addressed table areas, to each of which defined signal amplitude values of said modified analog incremental signals transmitted to said evaluation unit are assigned.

19. The position measuring system in accordance with claim 18, wherein said memory module comprises at least one conversion table per signal period variation factor provided.

20. A method for operating a position measuring system for determining the relative position of two objects, the method comprising:
moving a first object relative to a second object;
generating at least one pair of phase-shifted analog incremental signals in response to said moving of said first object relative to said second object, and
varying the signal periods of said at least one pair of phase-shifted analog incremental signals in a defined manner by at least one signal period variation factor;
dividing said at least one pair of phase-shifted analog incremental signals,
forming one or several digital words which correspond to the associated position values,
addressing a memory module by said formed one or several digital words, wherein said memory module comprises at least one conversion table for at least one signal period variation factor and by means of which modified analogs incremental signals with a changed signal period are formed.

21. The method in accordance with claim 17, wherein said modified analog incremental signals have a signal period which has a defined relationship with respect the signal periods of said at least two phase shifted analog incremental signals.

22. The method in accordance with claim 20, wherein the at least two different signal periods have a whole number relationship in respect to each other.

23. The method in accordance with claim 20, wherein the signal periods are varied as a function of the relative velocity of said first and second objects.

24. The method in accordance with claim 23, wherein in the case of higher relative velocities a larger signal period is set than in the case of lower relative velocities.

25. The method in accordance with claim 20, further comprising converting the instant actual signal period to a different signal period.

26. The method in accordance with claim 20, wherein the variation of the signal period of said at least one pair of phase-shifted analog incremental signals is performed at a defined switching time, at which a zero crossover of one of said at least one pair of phase-shifted analog incremental signals occurs.

27. The method in accordance with claim 20, further comprising transmitting said at least one pair of phase-shifted analog, incremental signals to an evaluation unit.

28. The method in accordance with claim 20, further comprising eliminating errors resulting in the course of the signal period variation.

29. The method in accordance with claim 28, wherein the eliminating of errors comprises:
determining the instant set position measurement value, continuously determining an instant set position measurement value, comparing the determined instant set position measurement value with the instant actual position measurement value, changing address counting values of an address counting unit in a defined manner.

30. The method in accordance with claim 28, further comprising continuously detecting parameters in relation to the measuring environment for correcting the errors in the position determination resulting in the course of measurement.

31. The method in accordance with claim 28, further comprising:

using measurement arrangement-specific compensation data for correcting the errors in the position determination resulting in the course of measurement, and determining the instant set position measurement value.

32. The method in accordance with claim 20, wherein said varying of said signal periods of said at least one pair of phase-shifted analog incremental signals is accomplished by said at least one conversion table which is associated with a signal period variation unit and is stored in said memory module and has several addressed table areas, and said method further comprising:

assigning to each of said several addressed table areas defined signal amplitude values of said modified analog incremental signals, and transmitting said modified analog incremental signals to an evaluation unit.

33. The method in accordance with claim 32, further comprising:

supplying said at least one pair of phase-shifted analog incremental signals to an interpolation unit and a direction determination unit (23), behind whose outputs an address counting device is arranged, and actuating said addressed table areas of said at least one conversion table in said memory module on the output side by said address counting unit.

34. The method in accordance with claim 33, actuating said at least one conversion table in preset actuating step sizes by address counting unit, and assigning a defined actuation step size to each signal period variation factor.

35. The method in accordance with claim 33, transmitting said signal amplitude values assigned to said addressed table areas to at least one D/A converter unit, which generates said modified analog incremental signals intended for transmission to said evaluation unit.

36. A position measuring system for determining the relative position of two objects which can be moved in relation to each other, the position measuring system comprising:

means for generating at least one pair of phase-shifted analog incremental signals, a signal period variation unit t hat receives said at least one pair of phase-shifted analog incremental signal and generates modified analog incremental signals that contain a variation of the signal periods of the at least one pair of phase shifted analog incremental signals by at least one signal period variation factor; and an evaluation unit so as to receive said modified analog incremental signals, said evaluation unit is connected via at least one control line with said signal period variation unit, through which a control signal is transmitted for varying the signal periods of said at least one pair of phase-shifted analog incremental signals.

37. The position measuring system in accordance with claim 36, wherein said signal period variation unit comprises a memory module comprising a conversion table, which has several addressed table areas, to each of which defined signal amplitude values of said modified analog incremental signals transmitted to said evaluation unit are assigned.

38. The position measuring system in accordance with claim 37, wherein said memory module comprises at least one conversion table per signal period variation factor provided.

39. The position measuring system in accordance with claim 37, wherein said signal period variation unit comprises:

an interpolation unit for the generation of interpolated digital signals and which receives said at least one pair of phase-shifted analog incremental signals, a direction determination unit which receives said at least one pair of phase-shifted analog incremental signals, and an address counting unit is arranged behind outputs of said interpolation unit and said direction determination unit, through which on an output side said addressed table areas of said at least one conversion table in said memory module is actuated.

40. A method for operating a position measuring system for determining the relative position of two objects, the method comprising:

moving a first object relative to a second object;

generating at least one pair of phase-shifted analog incremental signals in response to said moving of the first object relative to the second object, varying the signal periods of said at least one pair of phase-shifted analog incremental signals in a defined manner by at least one signal period variation factor; and converting the instant actual signal period to a different signal period.

41. The method in accordance with claim 40, further comprising eliminating errors resulting in the course of the signal period variation.

42. The method in accordance with claim 41, wherein the eliminating of errors comprises:

determining the instant set position measurement value, continuously determining an instant set position measurement value, comparing the determined instant set position measurement value with the instant actual position measurement value, changing address counting values of an address counting unit in a defined manner.

43. The method in accordance with claim 41, further comprising continuously detecting parameters in relation to the measuring environment for correcting the errors in the position determination resulting in the course of measurement.

44. The method in accordance with claim 41, further comprising:

using measurement arrangement-specific compensation data for correcting the errors in the position determination resulting in the course of measurement, and determining the instant set position measurement value.

45. A method for operating a position measuring system for determining the relative position of two objects, the method comprising:

moving a first object relative to a second object;

generating at least one pair of phase-shifted analog incremental signals in response to said moving of the first object relative to the second object, varying the signal periods of said at least one pair of phase-shifted analog incremental signals in a defined manner by at least one signal period variation factor to form modified analog incremental signals, said varying the signal periods is accomplished by at least one conversion table which is associated with a signal period variation unit and is stored in a memory module and has several addressed table areas, assigning to each of said several addressed table areas defined signal amplitude values of said modified analog incremental signals, and transmitting said modified analog incremental signals to an evaluation unit.

46. The method in accordance with claim 45, further comprising eliminating errors resulting in the course of the signal period variation.

47. The method in accordance with claim 46, wherein the eliminating of errors comprises:

determining the instant set position measurement value, continuously determining an instant set position measurement value, comparing the determined instant set position measurement value with the instant actual position measurement value, changing address counting values of an address counting unit in a defined manner.

48. The method in accordance with claim 46, further comprising continuously detecting parameters in relation to the measuring environment for correcting the errors in the position determination resulting in the course of measurement.

49. The method in accordance with claim 46, further comprising:

using measurement arrangement-specific compensation data for correcting the errors in the position determination resulting in the course of measurement, and determining the instant set position measurement value.

50. The method in accordance with claim 45, further comprising:

supplying said at least one pair of phase-shifted analog incremental signals to an interpolation unit and a direction determination unit, behind whose outputs an address counting device is arranged, and actuating said several addressed table areas of said at least one conversion table in said memory module.

51. The method in accordance with claim 50, further comprising:

actuating said at least one conversion table in preset actuating step sizes by an address counting unit, and assigning a defined actuation step size to each signal period variation factor.

52. The method in accordance with claim 50, further comprising:

transmitting said signal amplitude values assigned to said addressed table areas to at least one D/A converter unit, which generates said modified analog incremental signals intended for transmission to said evaluation unit.

* * * * *

UNITED STATES PATENT AND TRADEMARK OFFICE
CERTIFICATE OF CORRECTION

PATENT NO. : 6,097,318
DATED : August 1, 2000
INVENTOR(S) : Rainer Hagl et al.

It is certified that error appears in the above-identified patent and that said Letters Patent is hereby corrected as shown below:

On the Title Page

In column 2, after line 5, insert:

--5,235,406   8/1993   Ishii et al.
  5,347,355   9/1994   Eguchi--.

In column 2, after line 1, under "FOREIGN PATENT DOCUMENTS", insert:

--0 463 561 A1   1/1992   European Pat. Off.
  0 552 726 a2   7/1993   European Pat. Off.--.

In the Claims

In claim 1, line 14, delete "phase shifted" and substitute --phase-shifted-- in its place.

In claim 2, line 2, delete "phase shifted" and substitute --phase-shifted-- in its place.

In claim 5, line 5, delete "phase shifted" and substitute --phase-shifted-- in its place.

UNITED STATES PATENT AND TRADEMARK OFFICE
CERTIFICATE OF CORRECTION

PATENT NO. : 6,097,318
DATED : August 1, 2000
INVENTOR(S) : Rainer Hagl et al.

It is certified that error appears in the above-identified patent and that said Letters Patent is hereby corrected as shown below:

In the Claims (cont'd)

In claim 8, line 15, delete "phase shifted" and substitute --phase-shifted-- in its place.

In claim 20, line 19, delete "analogs" and substitute --analog-- in its place.

In claim 21, line 1, delete "claim 17" and substitute --claim 20-- in its place.

In claim 21, line 3, delete "respect the" and substitute --respect to the-- in its place.

In claim 21, line 4, delete "phase shifted" and substitute --phase-shifted-- in its place.

In claim 27, line 3, delete "analog," and substitute --analog-- in its place.

In claim 36, line 7, delete "unit t hat" and substitute --unit that-- in its place.

In claim 36, line 11, delete "phase shifted" and substitute --phase-shifted-- in its place.

UNITED STATES PATENT AND TRADEMARK OFFICE
CERTIFICATE OF CORRECTION

PATENT NO. : 6,097,318
DATED : August 1, 2000
INVENTOR(S) : Rainer Hagl et al.

Page 3 of 3

It is certified that error appears in the above-identified patent and that said Letters Patent is hereby corrected as shown below:

<u>In the Claims (cont'd)</u>

In claim 40, line 7, delete "object," and substitute --object;-- in its place.

In claim 45, line 7, delete "object," and substitute --object;-- in its place.

In claim 45, line 15, delete "areas," and substitute --areas;-- in its place.

In claim 45, line 18, delete "signals," and substitute --signals;-- in its place.

Signed and Sealed this

Twenty-ninth Day of May, 2001

Attest:

NICHOLAS P. GODICI

*Attesting Officer*   *Acting Director of the United States Patent and Trademark Office*